United States Patent [19]

Buehler et al.

[11] Patent Number: 4,590,136

[45] Date of Patent: May 20, 1986

[54] ELECTROCHEMICAL STORAGE CELL OF THE ALKALI METAL AND CHALCOGEN TYPE

[75] Inventors: Werner Buehler, Dossenheim; Stefan Mennicke, Leimen; Karl Reiss, Muehlhausen-Rettigheim; Susanne Terharn, Heidelberg, all of Fed. Rep. of Germany

[73] Assignee: Brown, Boveri & Cie AG, Mannheim, Fed. Rep. of Germany

[21] Appl. No.: 718,063

[22] Filed: Apr. 1, 1985

[30] Foreign Application Priority Data

Apr. 2, 1984 [DE] Fed. Rep. of Germany ....... 3412206

[51] Int. Cl.⁴ .......................................... H01M 10/04
[52] U.S. Cl. .................................. 429/104; 429/174; 429/185; 429/191
[58] Field of Search ................ 429/104, 174, 185, 191

[56] References Cited

U.S. PATENT DOCUMENTS

| | | | |
|---|---|---|---|
| 4,238,553 | 12/1980 | Weddigen et al. | 429/104 |
| 4,492,742 | 1/1985 | Haberfellner | 429/104 |
| 4,510,217 | 4/1985 | Kagawa et al. | 429/104 |

FOREIGN PATENT DOCUMENTS 1502693  3/1978  United Kingdom ................ 429/104

Primary Examiner—Anthony Skapars
Attorney, Agent, or Firm—Herbert L. Lerner; Laurence A. Greenberg

[57] ABSTRACT

Electrochemical storage cell of the alkali metal and chalcogen type with at least one anode chamber and one cathode chamber which are separated from each other by an alkali ion-conducting solid electrolyte and are bounded at least in some regions by a metallic housing, the solid electrolyte being fastened at its open end to the housing via a connecting element. At least one connecting element as a pressure ring and at least one compensating ring taking up the forces emanating from the pressuring ring are fastened at the open end of the solid electrolyte.

3 Claims, 2 Drawing Figures

4,590,136

ELECTROCHEMICAL STORAGE CELL OF THE ALKALI METAL AND CHALCOGEN TYPE

BACKGROUND OF THE INVENTION

1. Field of the Invention

The invention relates to an electrochemical storage cell of the alkali metal and chalcogen type with at least one anode chamber and one cathode chamber which are separated from each other by an alkali ion-conducting solid electrolyte and are bounded at least in some regions by a metallic housing, the solid electrolyte being fastened at its open end to the housing via a connecting element.

2. Description of the Prior Art

Electrochemical storage cells find use to an increasing degree in high-temperature storage batteries which serve as the energy source in electric vehicles.

Rechargeable electrochemical storage cells of the alkali metal and chalcogen type, the reactant spaces of which are separated from each other by a solid electrolyte, are eminently suitable for constructing high-temperature storage batteries. The solid electrolytes used in these cells, which are made, for instance, of beta aluminum oxide, are distinguished by the fact that partial conductivity of the mobile ions through it is very high and the partial conductivity of the electrons is smaller by many powers of ten.

German Published Non-Prosecuted Application (DE-OS) No. 31 45 112 describes an electrochemical storage cell which is bounded to the outside by a cup-shaped housing of metal. A similarly shaped solid electrolyte of beta aluminum oxide is disposed in the interior of the storage cell. An insulating ring of alpha aluminum oxide is arranged at the upper open end of the solid electrolyte. The insulating ring is connected to the solid electrolyte, for instance by glass solder. The insulating ring is designed and fastened to the solid electrolyte to take on a function of a flange pointing outward. The housing bounding the storage cell is provided at the upper end with an inward or outward-pointing flange on which the insulating ring is placed and is firmly connected thereto. In order to assure long service life in such storage cells, a hermetic seal of the reactant chambers from each other as well as of the storage cell to the outside must be assured. In the storage cells described here this is not possible in a durable manner, so that the penetration of oxygen into the reactant chambers is not precluded after several operating hours of the storage cell.

SUMMARY OF THE INVENTION

It is therefore an object of the invention to provide a connection of the solid electrolyte to the metallic housing of the storage cell with a hermetic seal separating the reactant chambers from each other and to the outside which seal will endure during the entire service life of the storage cell.

With the foregoing and other objects in view, there is provided in accordance with the invention an electrochemical storage cell based on alkali metal and chalcogen with at least one anode chamber and one cathode chamber which are separated from each other by an alkali ion-conducting solid electrolyte and are bounded at least in some regions by a metallic housing, the solid electrolyte being fastened at its open end to the housing via a connecting element, the combination therewith wherein at the open end of the solid electrolyte at least one connecting element as a pressure ring and at least one compensating ring taking up the forces emanating from the pressure ring are fastened.

Other features which are considered as characteristic for the invention are set forth in the appended claims.

Although the invention is illustrated and described herein as embodied in electrochemical storage cell, it is nevertheless not intended to be limited to the details shown, since various modifications may be made therein without departing from the spirit of the invention and within the scope and range of equivalents of the claims.

BRIEF DESCRIPTION OF THE DRAWINGS

The construction and method of operation of the invention, however, together with additional objects and advantages thereof will be best understood from the following description read in connection with the accompanying drawing, in which.

DESCRIPTION OF THE PREFERRED EMBODIMENTS

Figure 1:
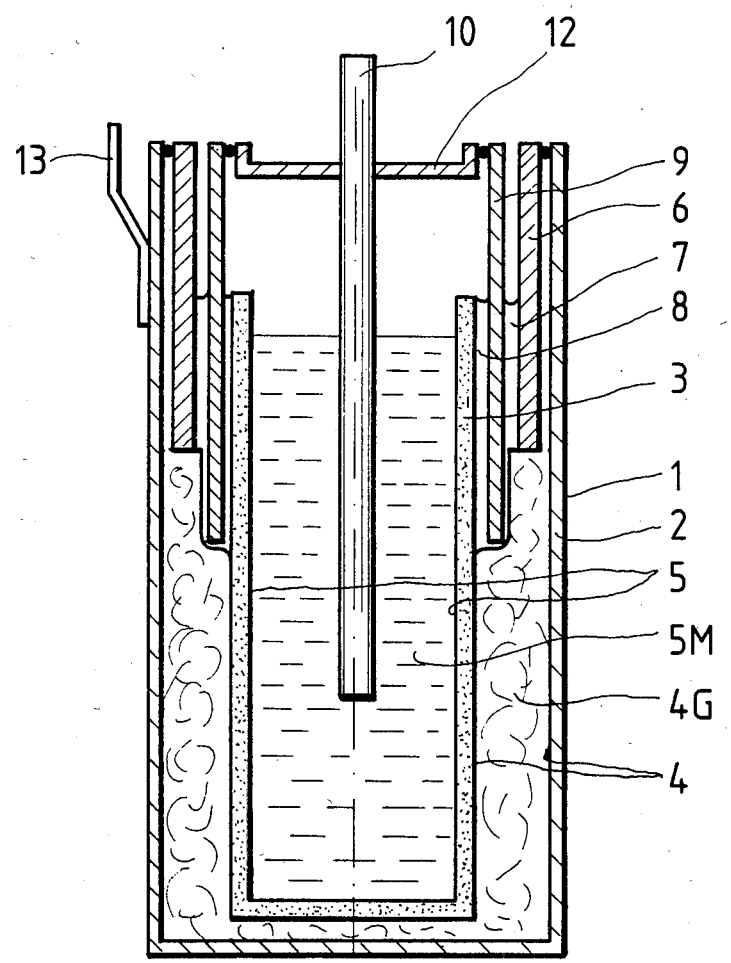
FIG. 1 diagrammatically illustrates an electrochemical storage cell of the sodium/sulfur type with an anode chamber and a cathode chamber separated by an cup-shaped alkali ion-conducting solid electrolyte and bounded by a metal housing. The reactant chambers are sealed from each other by a pressure ring fastened to the electrolyte by means of a glass or ceramic layer and directly connected to the metallic housing, as well as a compensating ring fastened to the electrolyte by means of a glass or ceramic layer.

The invention relates to an electrochemical storage cell with an anode chamber and a cathode chamber which are separated from each other by an alkali ion-conducting solid electrolyte and are bounded at least in some regions by a metallic housing. In order to seal the reactant chambers from each other and hermetically to the outside, the solid electrolyte is provided with a pressure ring which is directly connected to the metallic housing. In order to compensate for the forces emanating from the pressure ring, a compensating ring is fastened at the upper end of the solid electrolyte by means of a glass or ceramic layer. The pressure ring is likewise connected by a glass or ceramic layer to the solid electrolyte. By virtue of the glass connection of a pressure ring at the upper end of the solid electrolyte, an optimum connection between the solid electrolyte and the metallic housing is ensured. Additionally, a compensating ring is fastened to the upper end of the solid electrolyte. It serves to take up the forces exerted by the pressure ring. The use of the pressure ring and a compensation ring precludes damage to the solid electrolyte in the event of temperature changes. At the same time, an optimum seal of the reactant chamber arranged between the solid electrolyte and the metallic housing is assured. The pressure ring may be used as a current collector for the reactant chamber arranged between the solid electrolyte and the metallic housing. If the compensating ring is disposed in the interior of the solid electrolyte, the ring can serve as the current collector for the reactant chamber provided there. A hermetic seal of the reactant chamber in the cup-shaped solid electrolyte can be brought about by a metallic sealing cover 12 which is fastened at its outer rim to the upper end of the compensating ring. The compensating ring is fastened either to the inside surface or to the outside surface of the cup-shaped solid electrolyte. Preferably, the compensating ring is held at the solid electrolyte such that it extends a few millimeters beyond its open end. The compensating ring is fastened by means of a glass layer between the solid electrolyte and the compensating ring. The pressure ring is likewise fastened by means of a glass layer either to the compensating ring or to the outside surface of the solid electrolyte. In the case where the compensating ring is fastened to the outside surface of the solid electrolyte, the pressure ring is arranged so that its upper end is terminated with the upper end of the compensating ring. The pressure ring's outer rim is solidly connected to the inside surface of the metallic housing, which bounds the storage cell to the outside. By insertion of the compensating ring and the pressure ring as well as the glass layer arranged between the solid electrolyte and the compensating ring or between the compensating ring and the pressure ring, the reactant chamber provided between the solid electrolyte and the metallic housing is sealed completely to the outside. If the pressure ring is fastened directly to the outside surface of the solid electrolyte, the glass layer which holds it at the outside surface of the solid electrolyte is chosen to be sufficiently thick to cause the pressure ring to extend almost to the inside surface of the metallic housing. Thereby, the former can be fastened to the housing forming a complete seal of the reactant chamber between the solid electrolyte and the metallic housing by the glass layer and the pressure ring.

In the storage cell according to the invention, the seal is so tight even after many hours of operation, that no oxygen can penetrate into the reactant chambers from the outside. As a consequence of such tight and durable sealing, the reactants are always available for the electrode reactions, so that there is no danger of a material drop in capacity even in an old storage cell due to the detrimental effect of oxygen.

The invention will be explained in the following, making reference to the drawings.

FIG. 1 shows an electrochemical storage cell 1 of the sodium and sulfur type. Major elements of the storage cell are a metallic housing 2 and a solid electrolyte 3. The metallic housing is of cup-shaped design and is provided on its inside with corrosion protection (not shown here). In the interior of the metallic housing 2, a cup-shaped solid electrolyte 3 is likewise arranged which is made of beta aluminum oxide. The dimensions of the solid electrolyte 3 are chosen so that between the inside surface of the housing 2 and its outside surface a coherent space 4 remains which, in the embodiment example shown here, serves as a cathode space. The interior of the solid electrolyte 3 is utilized as the anode chamber 5. The height of the solid electrolyte 3 is chosen so that its upper end is slightly below, preferably several millimeters below the upper end of the metallic housing 2. In the embodiment example shown here, a pressure ring 6 is fastened to the upper end of the solid electrolyte 3 and in particular to its outside surface. According to the invention, the pressure ring 6 is not connected directly to the outside surface of the solid electrolyte 3. Rather, a compensating ring 9, embedded in two glass layers 7 and 8 at least in certain regions is provided between the inside surface of the pressure ring 6 and the outside surface of the solid electrolyte 3. Instead of the two glass layers 7 and 8, ceramic layers can be used. The pressure ring 6 is made of a metal, for instance, of a ferritic chromium steel. On the other hand, it can also be made of a ceramic material. The compensating ring arranged between the two glass layers 7 and 8 is likewise made of metal. The material used for its fabrication is chosen so that it is resistant to sodium, and has a coefficient of expansion only slightly higher than that of beta aluminum oxide. Preferred metals for the manufacture of the compensating ring are iron, cobalt or nickel alloys. The compensating ring 9 is plated with chromium or niobium before it is joined to the solid electrolyte 3. In the fabrication of the storage cell 1, especially when joining the solid electrolyte 3 to the pressure ring 6, a ring 8 of glass is arranged around the upper end of the solid electrolyte 3. The diameter of this ring 8, which may also consist of ceramic, is chosen to correspond to the outside diameter of the solid electrolyte 3. The compensating ring 9 is arranged around this ring which forms the glass layer 8, so that its lower end terminates approximately with the lower end of the ring forming the glass layer 8. The inside diameter of the compensating ring 9 is designed so that it can just be slipped over the ring forming the glass layer 8. A further ring 7 which is likewise made of glass is arranged around the compensating ring 9. The lower end of the compensating ring 9 can be completely surrounded by the two glass layers in the finished state of the storage cell. The glass ring 7 arranged around the compensating ring is itself surrounded by the pressure ring 6. In the embodiment example shown here, the ring forming the glass layer 7 is arranged so that it is located in the lower or middle region of the pressure ring and is terminated toward the top with the upper end of the solid electrolyte. The pressure ring 6 is positioned so that its lower end terminates with the lower end of the glass layer 7. The dimensions of the pressure ring 6 and the compensating ring 9 are chosen so that they extend upward beyond the solid electrolyte by a few millimeters. After the rings 6, 7, 8 and 9 are arranged around the upper end of the solid electrolyte 3 in the manner described above, this arrangement is subject to a heat treatment. The temperature chosen is sufficiently high such that the rings of glass melt and the pressure ring begins to expand. Subsequently the joint formed in this manner is cooled below the transformation point of the glass, whereby the glass layers and the compensating ring are put under compression stress from all sides by the pressure ring. Thereby, a gas-tight, insulating connection between the pressure ring 6 and the solid electrolyte 3 is formed which can be highly stressed thermally. The compensating ring 9 ensures that the forces emanating from the pressure ring 6 are intercepted in part by the glass layers 7 and 8 of the compensating ring. Thereby, damage to the solid electrolyte due to a constriction by the forces emanating from the pressure ring 6 is prevented.

The dimensions of the pressure ring 6 and the compensating ring 9 as well as of the layers 7 and 8 are chosen so that, after being joined to the solid electrolyte 3 or to each other, they have a width such that the pressure ring 6 extends to the inside surface of the metallic housing 2, and can be fastened by a welded joint to the inside surface of the metallic housing 2. Good heat removal assures that the compression stress generated by the pressure ring is maintained during the welding process.

A hermetic seal of the cathode chamber 4 which is arranged between the solid electrolyte 3 and the metallic housing is obtained by the direct connection of the pressure ring 6 to the inside surface of the metallic housing 2. In the embodiment example shown here, the cathode chamber 4 is filed with a graphite felt 4G which is saturated with sulfur. The interior of the solid electrolyte 3 serves as the anode chamber 5. The latter is filled with sodium and metal wool 5M which firmly surrounds the current collector 10. The current collector is designed as a rod and extends far into the solid electrolyte 3. Its upper end is brought through the terminating lid 12 of the storage cell and protrudes beyond the latter outward by a few millimeters.

Since the pressure ring 6 is made of metal, it can take over the function of the cathodic current collector. It is connected to the metallic housing in an electrically conducting manner so that the same can be used as the external terminal element. It is possible, of course, to fasten to the outside surface of the housing particularly at the upper end of the storage cell, an electric conductor which is connected to the pressure ring 6 serving as the current collector via the metallic housing 2 in an electrically conducting manner. The storage cell 1 is sealed to the outside via a terminating cover 12. The latter is substantially plate-shaped and provided with an upward-pointing rim formed in the manner of a flange which is fastened to the inside surface of the compensating ring 9.

A storage cell 1 designed in this manner can also be used as an inverse stage cell. In particular, the anode chamber may be arranged between the solid electrolyte and the metallic housing 2, while the interior of the solid electrolyte 3 serves as the cathode chamber.

Figure 2:
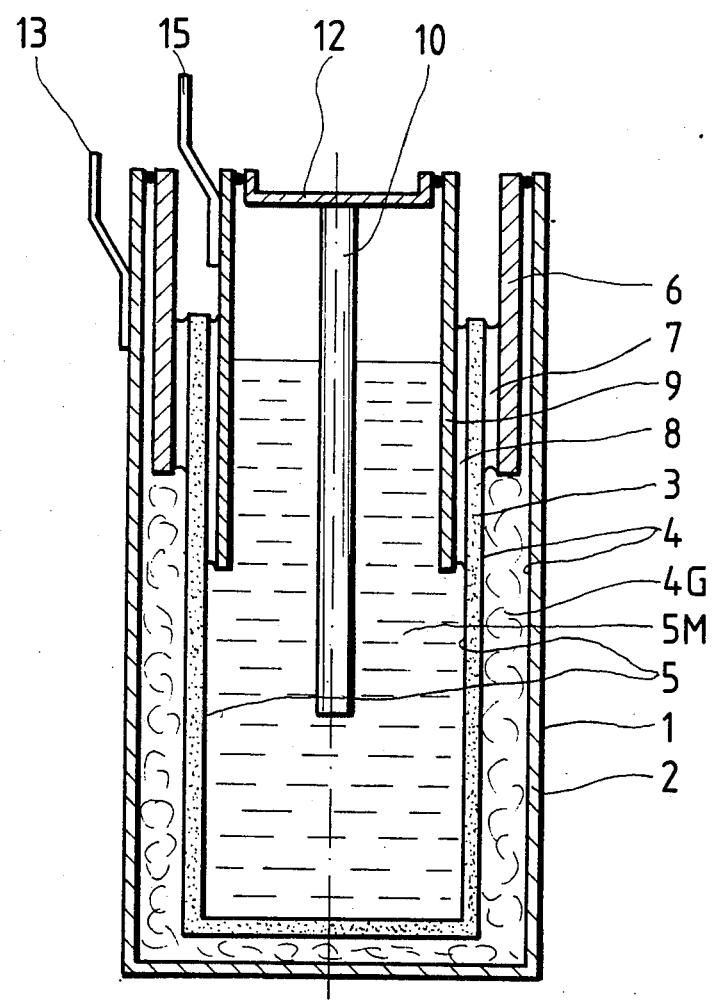
FIG. 2 is a variant of the storage cell shown in FIG. 1 wherein the compensating ring is fastened to the inside surface of the solid electrolyte.

In FIG. 2, a variant of the storage cell according to the invention is shown. The storage cell 1 shown here similarly has a metallic housing 2 and a solid electrolyte 3. The metallic housing 2 is cup-shaped and is provided with corrosion protection (not shown here) on its inside surface. The solid electrolyte 3 is arranged in the interior of the metallic housing 2 and is likewise cup-shaped. Its dimensions are chosen so that between the inside surface of the metallic housing 2 and the outside surfaces of the solid electrolyte 3 a coherent space 4 is formed which serves as the cathode chamber. The latter is filled with a graphite felt 4G which is saturated with sulfur. The interior of the solid electrolyte 3 serves as the anode chamber 5 and is filled with sodium as well as a metal wool 5M. In this embodiment a pressure ring 6 is also arranged at the upper open end of the solid electrolyte. The pressure ring 6 is connected via a glass layer 7 to the outside surface of the solid electrolyte 3. In order to prevent a constriction of the solid electrolyte 3 by the forces exerted by the pressure ring 6, a compensating ring 9 is fastened to the inside surface of the solid electrolyte 3. The connection of the compensating ring 9 to the solid electrolyte 3 is made via a glass layer 8. The compensating ring 9 is preferably made of an iron-cobalt-nickel alloy or molybdenum. The layers 7 and 8 can also be formed of ceramic. The connection of the pressure ring 6 and the compensating ring 9 to the solid electrolyte 3 is made in the same manner as explained in the description of FIG. 1. The pressure ring 6 is fabricated of metallic material. In particular, a material which has a large coefficient of expansion is preferred for this purpose. The pressure ring 6 may be connected directly to the metallic housing 2 by welding. The thickness of the glass layer 7 and the pressure ring 6 is chosen to result in the cathode chamber 4 arranged between the solid electrolyte 3 and the metallic housing 2 of the finished storage cell 1, being sealed gas-tight from the outside by the pressure ring 6 and the glass layer 7. The pressure ring 6, if it is made of metal, can serve at the same time as the current collector for the cathode chamber 4. In this case, the metallic housing 2 can be used as the terminal element. On the other hand, an electric conductor start 13 can be connected at the upper end of the storage cell 1 to the metallic housing 2 which serves as the terminal element. The compensating ring 9 together with the glass layers 7 and and 8 take up the forces generated by the pressure ring 6, and, in the embodiment example shown here, the compensating ring 9 connected to the inside surface of the solid electrolyte 3, serves as the anodic current collector. Electrical insulation between the cathodic current collector 6 and the anodic current collector 9 is achieved by the glass layers 7 and 8. The compensating ring 9 extends a few millimeters beyond the upper end of the solid electrolyte 3. The interior of the solid electrolyte 3 is sealed by a closing lid 12 from the outside, which lid 12 is welded to the inside surface of the compensating ring 9. The anodic current collector 10 which extends deep into the anode chamber 5 is fastened to the closing lid 12 and is connected in an electrically conducting manner, via the closing lid 12 and the compensating ring 9, to an anodic terminal element 15 which is fastened to the outside surface of the compensating ring 9.

This storage cell 1 can also be operated as an inverted storage cell.

The foregoing is a description corresponding, in substance, to German application No. P 34 12 206.0, dated Apr. 2, 1984, International priority of which is being claimed for the instant application, and which is hereby made part of this application. Any material discrepancies between the foregoing specification and the specification of the aforementioned corresponding German application are to be resolved in favor of the latter.

There is claimed:

1. Electrochemical storage cell based on alkali metal and chalcogen with at least one anode chamber and one cathode chamber which are separated from each other by an alkali ion-conducting solid electrolyte and are bounded at least in some regions by a metallic housing, the solid electrolyte being fastened at its open end to the housing via a connecting element, built as a pressure ring and at least one compensating ring taking up the forces emanating from the pressuring ring and both are fastened at the open end of the solid electrolyte, the compensating ring is arranged in the interior of the solid electrolyte and the pressure ring is arranged around the outside surface of the solid electrolyte, the pressure ring and the compensating ring are fastened to the solid electrolyte via a glass or ceramic layer, the lower end of the pressure ring terminating with the lower end of the layer, the lower end of the compensating ring terminating with the lower end of the layer below the lower end of the pressure ring, and the pressure ring is made of metal or ceramic and the compensating ring is made of an iron, cobalt or nickel alloy.

2. Electrochemical storage cell according to claim 1, wherein the space between the metallic housing and the solid electrolyte is sealed by the pressure ring and the glass or ceramic layer fastening the pressure ring to the solid electrolyte.

3. Electrochemical storage cell according to claim 1, wherein the pressure ring is made of ferritic chromium steel.

* * * * *